(12) United States Patent
Lambie

(10) Patent No.: US 7,055,838 B2
(45) Date of Patent: Jun. 6, 2006

(54) FOLDING TAILGATE MOUNTED STEP ASSEMBLY

(76) Inventor: Ken C. Lambie, 2507 S. Cresta La., Greenacres, WA (US) 99016

(*) Notice: Subject to any disclaimer, the term of this patent is extended or adjusted under 35 U.S.C. 154(b) by 0 days.

(21) Appl. No.: 10/440,989

(22) Filed: May 19, 2003

(65) Prior Publication Data
US 2004/0232649 A1 Nov. 25, 2004

(51) Int. Cl.
*B60R 3/02* (2006.01)

(52) U.S. Cl. .................... 280/166; 182/91; 182/127

(58) Field of Classification Search ............... 280/163, 280/164.1, 165, 166; 296/62, 57.1; 182/127, 182/150, 91, 97, 166, 90, 92, 85, 86
See application file for complete search history.

(56) References Cited

U.S. PATENT DOCUMENTS

| | | | | |
|---|---|---|---|---|
| 3,853,369 A | * | 12/1974 | Holden | ............... 296/62 |
| 3,865,399 A | * | 2/1975 | Way | ............... 280/166 |
| 3,876,230 A | * | 4/1975 | Phillips | ............... 280/166 |
| 4,191,388 A | | 3/1980 | Barksdale | |
| 4,527,941 A | * | 7/1985 | Archer | ............... 414/537 |
| 4,639,032 A | | 1/1987 | Barbour | |
| 4,757,876 A | | 7/1988 | Peacock | |
| 4,813,842 A | * | 3/1989 | Morton | ............... 414/557 |
| 4,846,487 A | | 7/1989 | Criley | |
| 4,848,821 A | | 7/1989 | Liewellyn | |
| 5,028,063 A | | 7/1991 | Andrews | |
| 5,205,603 A | | 4/1993 | Burdette, Jr. | |
| 5,312,150 A | | 5/1994 | Quam | |
| 5,505,476 A | * | 4/1996 | Maccabee | ............... 280/166 |
| 5,549,312 A | | 8/1996 | Garvert | |
| 5,617,930 A | | 4/1997 | Elia | |
| 5,732,996 A | | 3/1998 | Graffy et al. | |
| 6,082,751 A | * | 7/2000 | Hanes et al. | ............... 280/163 |
| 6,116,378 A | * | 9/2000 | Barrow | ............... 182/127 |
| 6,422,342 B1 | * | 7/2002 | Armstrong et al. | ......... 182/127 |
| 6,499,564 B1 | * | 12/2002 | Puglisi | ............... 182/150 |
| 6,659,224 B1 | * | 12/2003 | Medsker | ............... 182/91 |
| 2002/0003340 A1 | * | 1/2002 | Hallquist | ............... 280/163 |

* cited by examiner

*Primary Examiner*—Jeff Restifo

(57) ABSTRACT

A folding step assembly for the tailgate of a truck that provides two steps projecting rearwardly and downward and has grab handles for safe and convenient access into the bed of a truck. The step assembly is completely supported by the tailgate and does not touch the ground. It attaches to the inside panel of the tailgate and is completely concealed below the top edge of the tailgate when in the stowed position. The step assembly attaches to the tailgate by means of a Z shaped mounting bracket and lock bracket. The step assembly is locked onto the lock bracket with a lock and key and is easily removable from the tailgate when the user desires.

2 Claims, 11 Drawing Sheets

FOLDING TAILGATE MOUNTED STEP ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

REFRENCE TO A SEQUENCE LISTING, A TABLE, OR A COMPUTER PROGRAM LISTING COMPACT DISK APPENDIX

Not Applicable

BACKGROUND OF THE INVENTION

This invention relates to a step device to be attached to the tailgate of a truck. Today's trucks are taller, particularly with the popularity of four wheel drive trucks. Consumers seem to prefer the taller suspensions as is evident by the recent new trucks coming onto the market. Access to loading and unloading materials into the truck bed is difficult, requiring considerable agility and physical strength. Several attempts to provide convenient and safe access to the bed of a pick-up truck appear in prior art. U.S. Pat. No. 5,732,996 to Graffy et al. (1998), U.S. Pat. No. 4,639,032 to Barbour (1987), and U.S. Pat. No. 4,191,388 to Barksdale (1980) show various U shaped step assemblies which attach to the edge of a tailgate and have a stored position against the inside panel of the tailgate and swing out into an in use position. These steps are very narrow and only provide one step up into the pick-up truck bed. These steps provide only limited assistance in accessing the bed of the pick up truck because they do not provide for any grab handles and they only have one step. Considerable physical effort is still required to gain safe and convenient access to the truck bed without grab handles and with only one narrow step.

U.S. Pat. No. 5,617,930 to Elia (1997), U.S. Pat. No. 5,205,603 to Burdette, Jr. (1993), and U.S. Pat. No. 4,757,876 to Peacock (1988) show various ladder apparatus which attach to a tailgate. All of these ladder apparatus provide multiple steps to access the bed of a truck and some contain grab handles however, all of these apparatus require engagement with the ground when in the deployed or in-use position. This is undesirable due to uneven ground conditions, which may be present where the step is desired to be deployed.

U.S. Pat. No. 5,312,150 to Quam (1994) shows a tailgate with an integral step surface containing multiple steps formed into the inside panel of the tailgate. This tailgate step requires the complete replacement of an existing tailgate. This is undesirable because the outside appearance of the pick-up truck will be changed and the entirely new tailgate will be costly. No grab handles are present in this apparatus.

U.S. Pat. No. 5,549,312 to Garvert (1996), U.S. Pat. No. 5,028,063 to Andrews (1991), and U.S. Pat. No. 4,846,487 to Criley (1989) show a single, large, step, which unfolds, from a frame to provide access to the pick-up truck bed. These steps provide limited assistance in accessing the pick-up truck bed because they provide only one step up to the tailgate.

U.S. Pat. No. 4,848,821 to Llewellyn (1989) shows a tailgate mounted assembly consisting of two steps which are completely supported by the tailgate. This apparatus attaches to the outside panel of the tailgate which is undesirable because the outside appearance of the truck is altered. This step assembly does not have grab handles.

BRIEF SUMMARY OF THE INVENTION

The present invention is a folding step system that is mounted to the interior surface of a truck tailgate and below the top edge of the tailgate. The folding step system provides grab handles and two steps that project downwardly and rearwardly from the horizontal plane of the open tailgate providing staircase access into the bed of a truck. The folding step system is completely supported by the tailgate, making its use independent of ground condition. The folding step assembly can be quickly removed from the tailgate with a lock and key.

The objects and advantages of my invention are:
 (a) to provide staircase access into the bed of a truck utilizing two steps that when deployed project rearwardly and downward for safe and convenient access into the bed of a truck;
 (b) to provide grab handles for enhancing safe and convenient access into the bed of a truck;
 (c) to provide a step system that is completely supported by the tailgate, making its use independent of ground condition;
 (d) to provide a step system that is completely concealed below the top edge of the tailgate when in the stowed position making this step system compatible with other truck accessories such as bed covers;
 (e) to provide a step system that can be quickly removed from the tailgate so that when the space taken up by the step is needed, a user can quickly remove the step;
 (f) to provide a folding step system that is locked onto the tailgate to prevent theft;
 (g) to provide a system to mount the step to the tailgate that is compatible with many pick-up trucks tailgate designs reducing the inventory required to market and sell this step system to owners of different truck models.

Further objects and advantages of my invention will become apparent from a consideration of the drawings and ensuing description.

BRIEF DESCRIPTION OF DRAWINGS

In the drawings, closely related figures have the same number but different alphabetic suffixes.

Figure 1A:
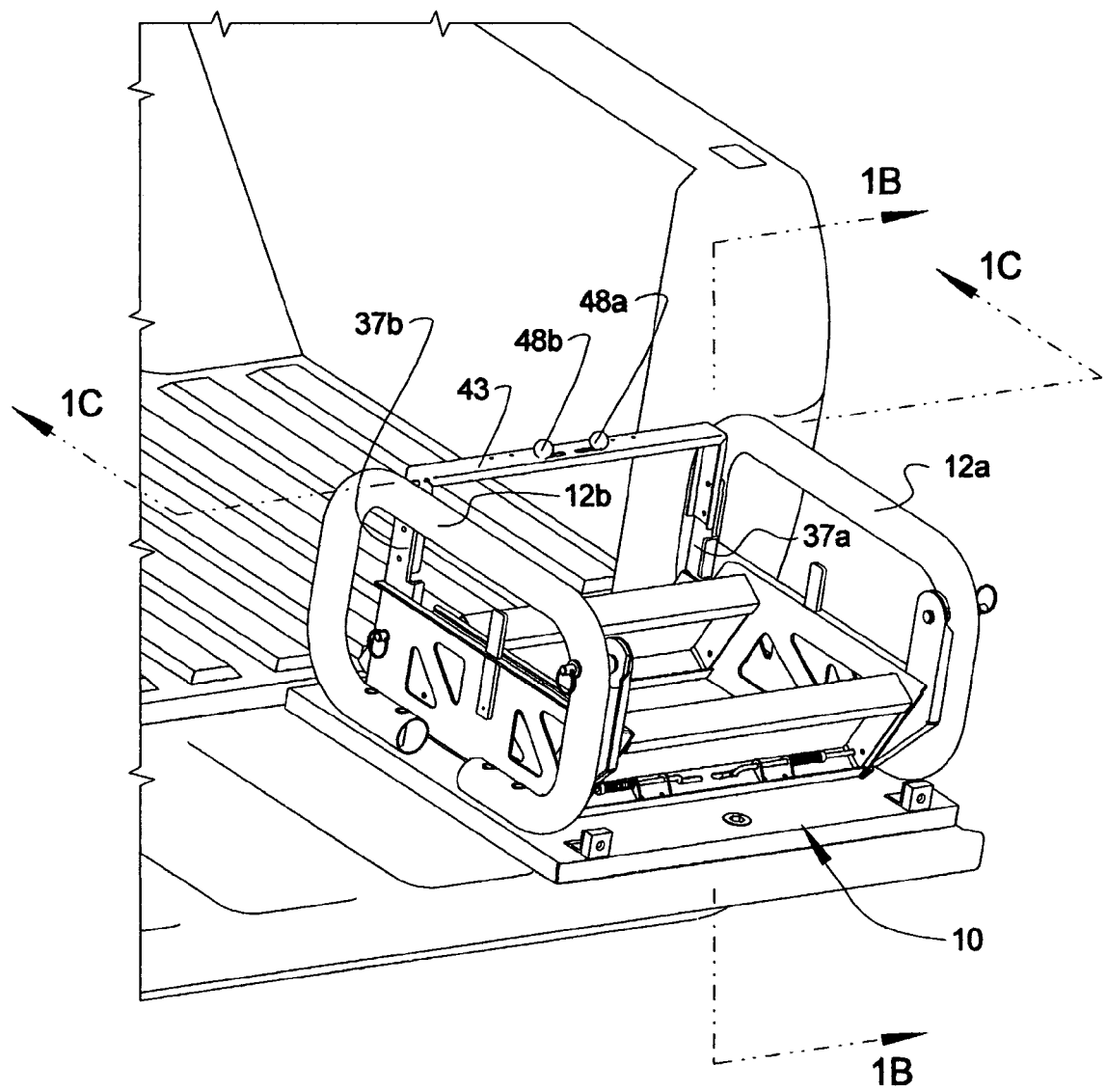
FIG. 1A shows the tailgate step assembly in the stowed position.

| REFERENCE NUMERALS IN DRAWINGS | |
|---|---|
| 10 tailgate step assembly | 12 tubular grab handle |
| 13 base | 14 upper step leg |
| 15 holes in lower portion of grab handle | 16 reinforcement |
| 17 return flanges on base | 18 tailgate |
| 19 mounting bracket | 20 lock bracket |
| 21 rubber trim | 22 lock |
| 23 lock pawl | 24 return flange on lock bracket |
| 25 upwardly formed flange on lock bracket | 26 tubular bearing block |
| 27 flange bearing | 28 spacer |
| 29 clevis pin | 30 ring |
| 31 flange on upper step leg | 32 holes in upper step leg |
| 33 reaction bracket | 34 hole in reaction bracket |
| 35 bumper | 36 reaction bracket |
| 37 reaction bracket | 38 flange on reaction bracket |
| 39 lower step leg | 40 flange bearing |
| 41 spacer | 42 clevis pin |
| 43 cross brace | 44 hole in cross brace |
| 45 lock rod | 46 lock rod bracket |
| 47 slots in cross brace | 48 plastic knob |
| 49 compression spring | 50 set collar |
| 51 hole in tubular grab handle | 52 upper step |
| 53 lower step | 54 holes in lower step leg |
| 55 notch on lower step leg | 56 tab on lower step leg |
| 57 hole in lower step | 58 lock rod |
| 59 lock rod bracket | 60 flange on lower step |
| 61 slots in flange on lower step | 62 plastic knob |
| 63 compression spring | 64 set collar |
| 65 hole in upper step leg | 66 bumper |
| 67 key | |

DETAILED DESCRIPTION OF THE INVENTION

Figure 1B:
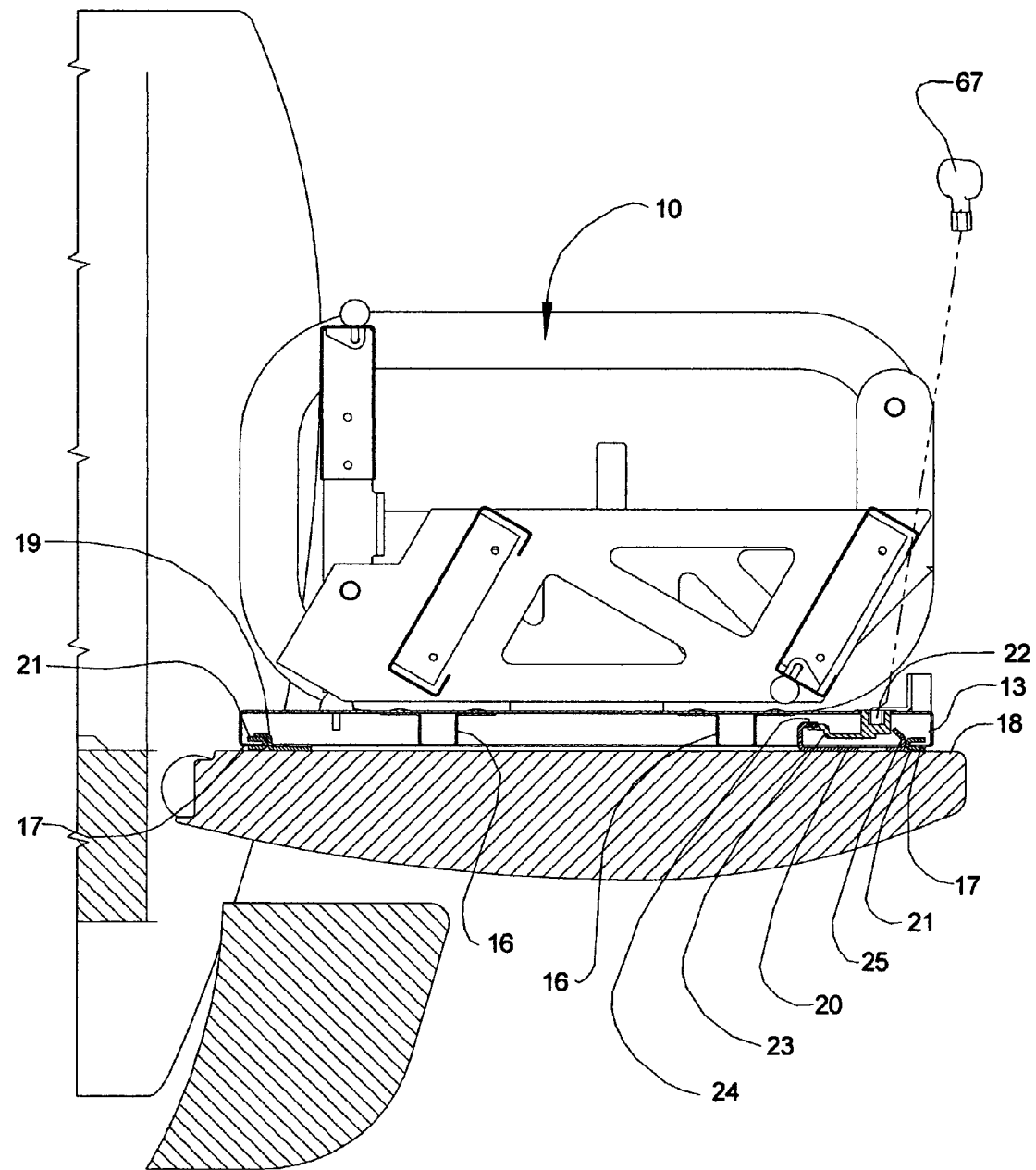
FIG. 1B shows a section view of the tailgate step assembly through a longitudinal axis.

FIG. 1B shows a cutaway perspective view of the tailgate step assembly 10 in a stowed position. Referring to this figure, a base 13 is made of sheet metal and is formed with return flanges 17 on all four sides. The return flange 17 has a protective rubber trim 21 to prevent a tailgate 18 from being scratched attached along the entire perimeter of the return flange 17. Hat section reinforcements 16 are resistance welded to the underside of the base 13. A Z shaped mounting bracket 19 and a lock bracket 20 are attached to the tailgate 18 with fasteners such as sheet metal screws. The Z shaped mounting bracket 19 overlaps the forward return flange 17 on the base 13. This overlap engagement prevents the base 13 from moving rearwardly and traps the forward flange 17 of the base 13 from lifting up off of the tailgate 18. The Z shaped mounting bracket 19 spans the distance between the fore/aft return flanges 17 (Refer to FIG. 5A) on the base 13 preventing side to side movement of the base 13. Referring back to FIG. 1B, a lock 22 with a lock pawl 23 is fastened through a hole in the base 13. The lock bracket 20 has a return flange 24, which the lock pawl 23 engages underneath in the locked position. This engagement prevents the rear edge of the base 13 from lifting up off of the tailgate 18. The lock bracket 20 also has an upwardly formed flange 25, which contacts the rear return flange 17 on the base 13 preventing forward movement of the base 18. Thus, all degrees of free movement of the base 13 are constrained, locking the base 13 onto the tailgate 18. A key 67 (refer to FIG. 1B) is used to insert into the lock 22 and is turned 90 degrees to disengage the lock pawl 23 from underneath the return flange 24 when it is desired to remove the tailgate step assembly 10 from the tailgate 18.

Figure 5A:
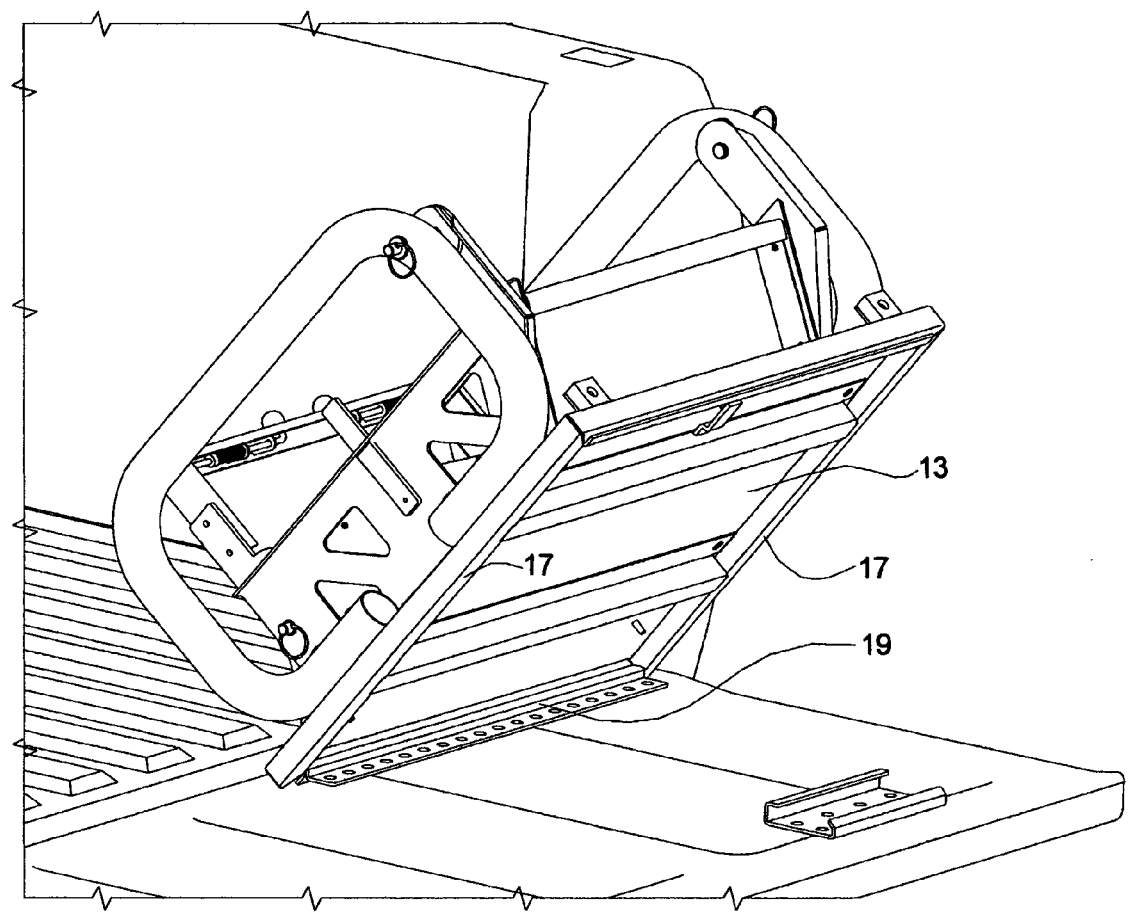
FIG. 5A shows the tailgate step assembly in the process of being removed from the tailgate.
Figure 5B:
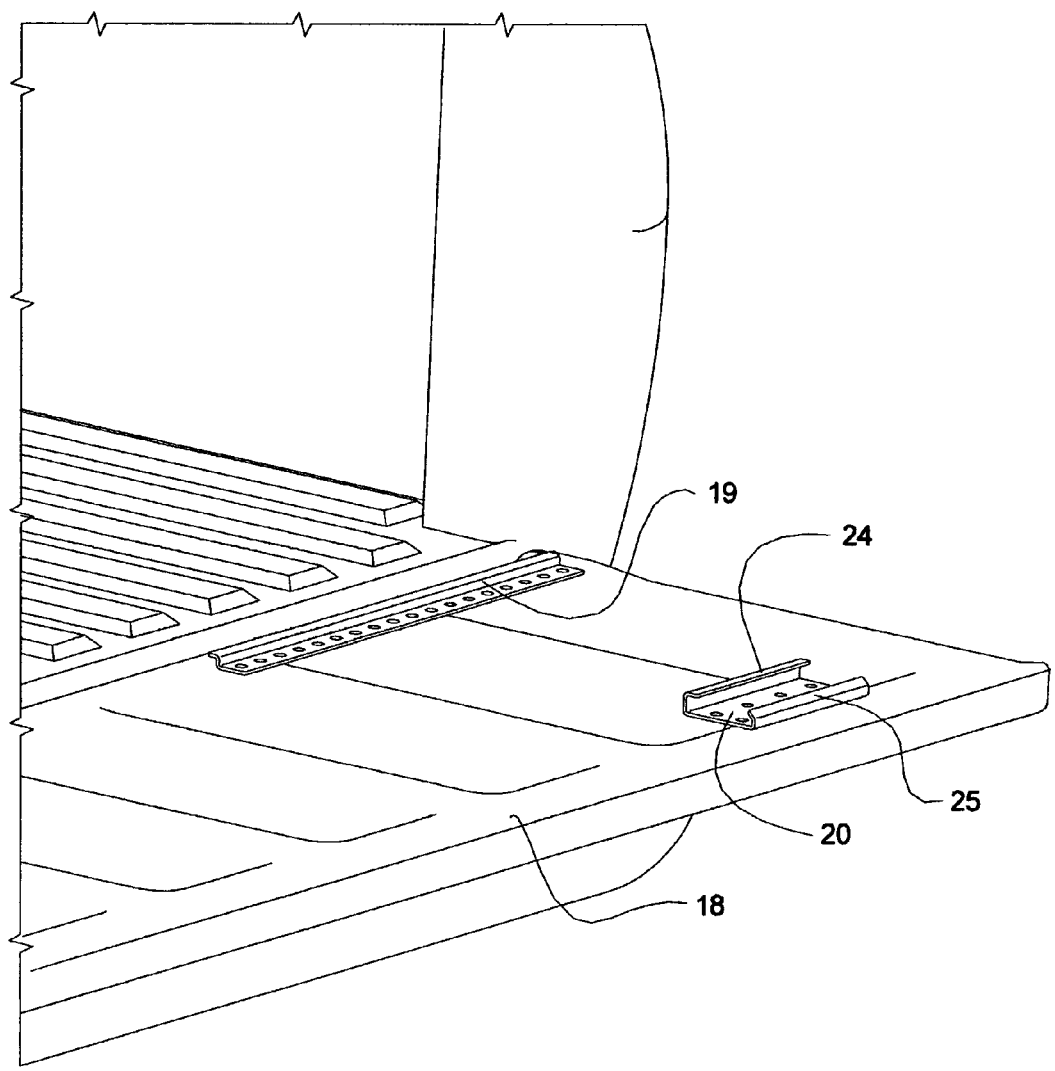
FIG. 5B shows the attachment brackets on the tailgate with the step assembly removed from the tailgate.

FIG. 5B shows the Z shaped mounting bracket 19 and the lock bracket 20 on the tailgate 18 with the step assembly removed. Referring to this figure, the Z shaped mounting bracket 19 is mounted on the tailgate 18 perpendicular to the longitudinal axis of the truck. Truck tailgate designs vary depending on the vehicle make and model. A primary difference between tailgate design is the spacing of the ribs and the width of the ribs. The perpendicular mounting of the Z shaped mounting bracket 19 enables multiple ribs to support the Z shaped mounting bracket 19 regardless of the rib size or spacing. Multiple holes in the Z shaped mounting bracket 19 ensure that a hole is available on top of a rib to insert a sheet metal screw through. The lock bracket 20 also has multiple holes to ensure a rib is available to screw into on numerous truck tailgate designs.

Figure 4A:
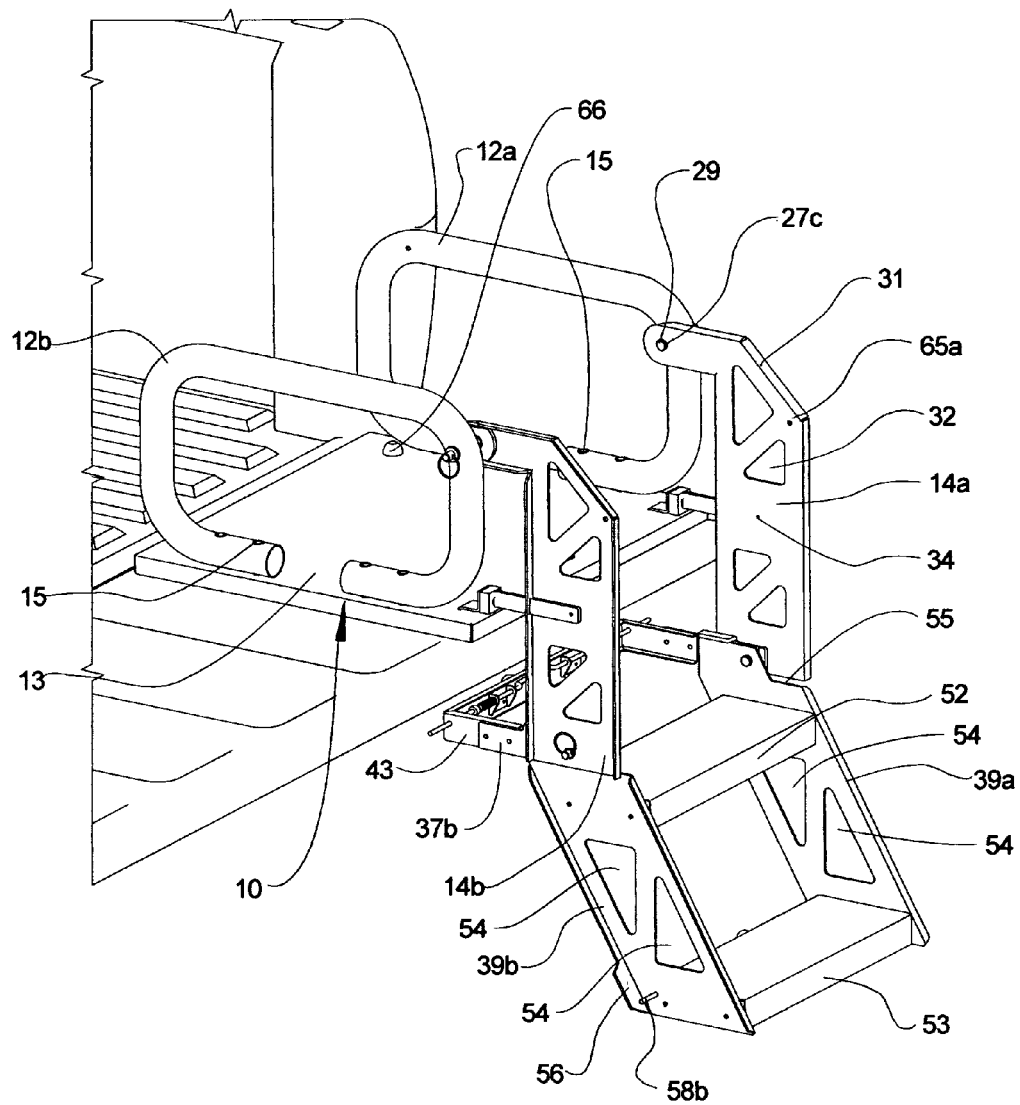
FIG. 4A shows the tailgate step assembly in the fully deployed position.

FIG. 4A shows a perspective view of the tailgate step assembly 10 in a fully deployed position. Referring to this figure, a pair of tubular grab handles 12a and 12b are formed into a rectangular shape with radius corners. The tubular grab handles 12a and 12b have holes 15 drilled in their lower portion for mounting to the base 13 with fasteners such as a nut and bolt. A hole is drilled in the rear upper radius corners of the tubular grab handles 12a and 12b through which a tubular bearing block 26 passes (refer to FIG. 4B which shows an enlarged perspective view of the upper rear corner of the tubular grab handle 12b). The tubular bearing block 26 is slightly longer that the diameter of the tubular grab handles 12a and 12b and is welded in place to the grab handles 12a and 12b. A bronze or plastic flange bearing 27a and 27b is pressed into each end of the tubular bearing block 26. A spacer 28 is resistance welded to the top portion of a pair of upper step legs 14a and 14b. The spacer 28 has a hole in its center. A hole is drilled or punched in the top portion of the upper step legs 14a and 14b. The hole in the top portion of the upper step legs 14a and 14b is concentrically aligned with the hole in the center of the spacer 28. The spacer 28 provides clearance between the upper step legs 14a and 14b and the tubular grab handles 12a and 12b so that the upper step legs 14a and 14b can rotate without interference. A flange bearing 27c is pressed into the hole in the spacer 28 and into the hole in the top portion of the upper step legs 14a and 14b. A clevis pin 29 is inserted through the flange bearings 27a, 27b, and 27c and is secured with a ring 30 which is passed through a hole in the end of the clevis pin 29.

Figure 4B:
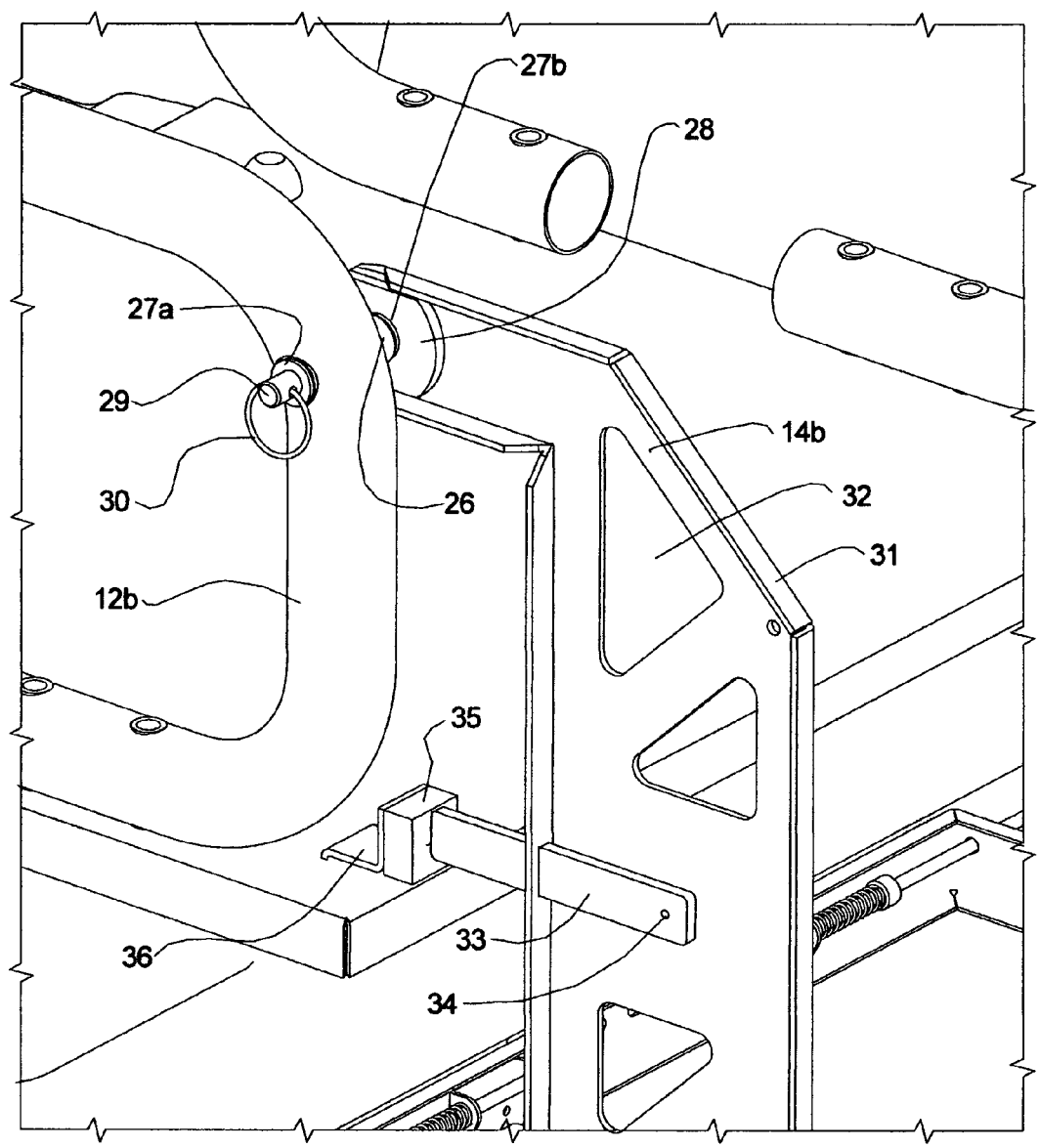
FIG. 4B shows an enlarged portion of the upper step leg attachment to the tubular grab handles.
Figure 4C:
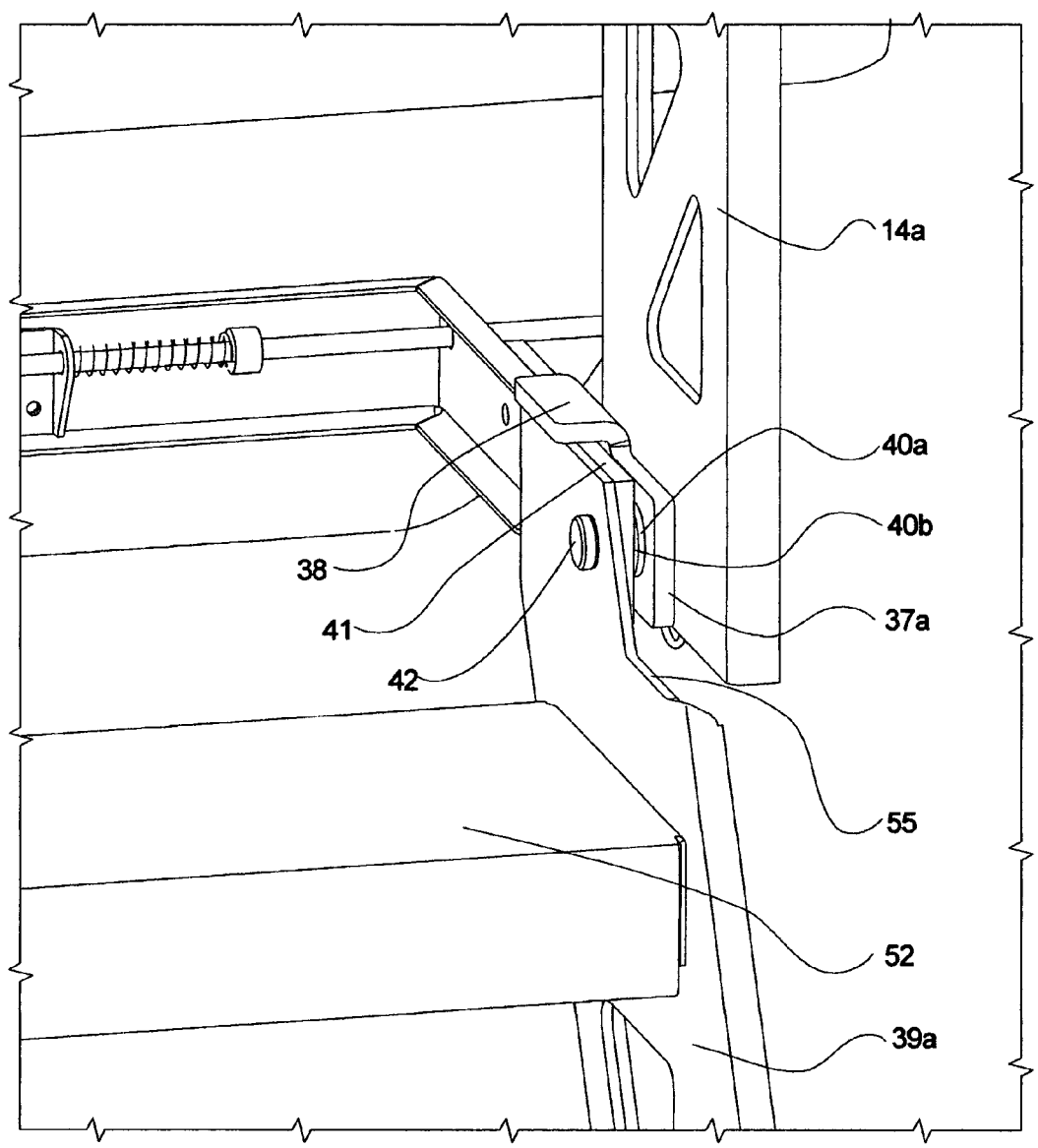
FIG. 4C shows an enlarged portion of the upper step leg to lower step leg attachment.

Referring to FIGS. 4A, 4B, and 4C, the upper step legs 14a and 14b are made of sheet metal. A flange 31 is formed in the upper step legs 14a and 14b to increase stiffness. A series of holes 32 are punched into the upper step legs 14a and 14b to remove unnecessary material to reduce weight. A reaction bracket 33 is resistance welded to the upper step legs 14a and 14b. The reaction bracket 33 passes through a rectangular hole punched into the flange 31 on the upper step leg 14a and 14b. A hole 34 is punched or drilled in the reaction bracket 33 and into the upper step legs 14a and 14b. The hole 34 is used in conjunction with the rectangular hole in the flange 31 of the upper step legs 14a and 14b to align the reaction bracket 33 during manufacturing. The reaction bracket 33 contacts a plastic or rubber bumper 35 when the upper step legs 14a and 14b are in the deployed position. The bumper 35 is attached with a screw to a reaction bracket 36. The reaction bracket 36 is resistance welded to the base 13. A pair of reaction brackets 37a and 37b is resistance welded to the bottom of the upper step legs 14a and 14b. The reaction bracket 37a and 37b has a hole punched or drilled in one end. The hole in the reaction brackets 37a and 37b is concentrically aligned with a hole punched or drilled in the bottom of the upper step legs 14a and 14b. The reaction brackets 37a and 37b have a flange 38 formed at 90 degrees which creates a surface for a pair of lower step leg 39a and 39b to react against when lower step legs 39a and 39b are in the deployed position. A flange bearing 40a is pressed through the hole in the reaction brackets 37a and 37b and the upper step legs 14a and 14b. A spacer 41 is resistance welded to the top of the lower step legs 39a and 39b. The spacer 41 has a hole drilled or punched in it. The hole in the spacer 41 is concentrically aligned with a hole that is drilled or punched in the top of the lower step legs 39a and 39b. A flange bearing 40b is pressed into the hole in the spacer 41 and the lower step legs 39a and 39b. A clevis pin 42 is inserted through the flange bearings 40a and 40b and secured with a ring 43 which is passed through a hole in the end of the clevis pin 42. The pivot point created by the clevis pin 42 and flange bearings 40a and 40b enable the lower step legs 39a and 39b to rotate relative to the upper step legs 14a and 14b.

Figure 1C:
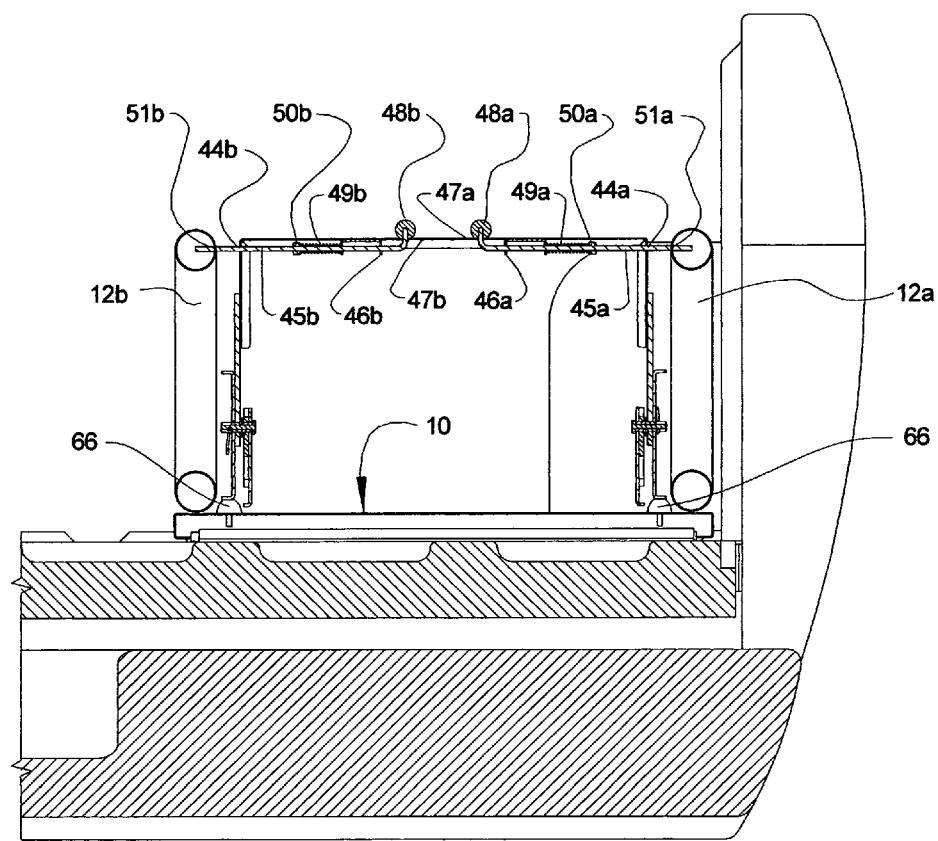
FIG. 1C shows a section view of the tailgate step assembly through an axis perpendicular to the longitudinal axis.

Referring to FIGS. 1A and 4A, a cross brace 43 is attached to the reaction brackets 37a and 37b. The cross brace 43 is formed into a U shape. Each leg of the U shaped cross brace 43 is attached to the reaction brackets 37a and 37b with fasteners such as a nut and bolt. Referring to FIG. 1C, the cross brace 43 ties the upper step legs 14a and 14b together to maintain rigid alignment between the upper step legs 14a and 14b. The cross brace 43 also serves as a handle to deploy the tailgate step with. The cross brace 43 has a hole 44a and 44b punched or drilled on each leg near the base of the U. A lock rod 45a and 45b is passed through the hole 44a and 44b. A lock rod bracket 46a and 46b is attached to the cross brace 43 with fasteners such as rivets. The lock rod bracket 46a and 46b attach the lock rod 45a and 45b to the cross brace 43 and allow the lock rod 45a and 45b to slide back and forth through holes in the lock rod bracket 46a and 46b. The lock rod 45a and 45b have a 90 degree bend on their inboard end which pass through a slot 47a and 47b in the cross brace 43. The inboard end of the lock rod 45a and 45b are threaded. A plastic knob 48a and 48b is threaded onto the inboard end of the lock rod 45a and 45b. The lock rod 45a and 45b pass through a compression spring 49a and 49b and a lock collar 50a and 50b. The lock collar 50a and 50b are locked onto the lock rod 45a and 45b with a setscrew. The compression spring 49a and 49b is trapped between the lock rod bracket 46a and 46b and the set collar 50a and 50b. A hole 51a and 51b in the tubular grab handles 12a and 12b provide an engagement point for the outboard end of the lock rod 45a and 45b.

Referring to FIG. 4A, an upper step 52 and a lower step 53 are attached to the lower step legs 39a and 39b with fasteners such as a nut and bolt. The steps are oriented on the lower step legs 39a and 39b such that when deployed, the steps are horizontal. In the fully deployed position, the upper step 52 is located an equal elevation distance between the lower step 53 and the base 13. The upper step legs 14a and 14b offset the lower step legs 39a and 39b rearwardly such that an equal fore/aft distance is maintained between the rear edge of the base 13 and the rear edge of each step.

Referring to FIGS. 4A and 4C, the lower step legs 39a and 39b are made from sheet metal. A series of holes 54 is punched into the lower step leg 39a and 39b removing unnecessary material to reduce weight. Flanges are formed into the lower step legs 39a and 39b to increase stiff-ness. A notch 55 is punched into the top of the upper step legs 39a and 39b to permit clearance between the upper step legs 39a and 39b and the reaction brackets 37a and 37b. A tab 56 is located on the lower step legs 39a and 39b to act as a stop when folding the step into the stowed position. The tab 56 contacts the upper step leg 14a and 14b when the lower step legs are rotated 150 degrees to the stowed position.

Figure 3A:
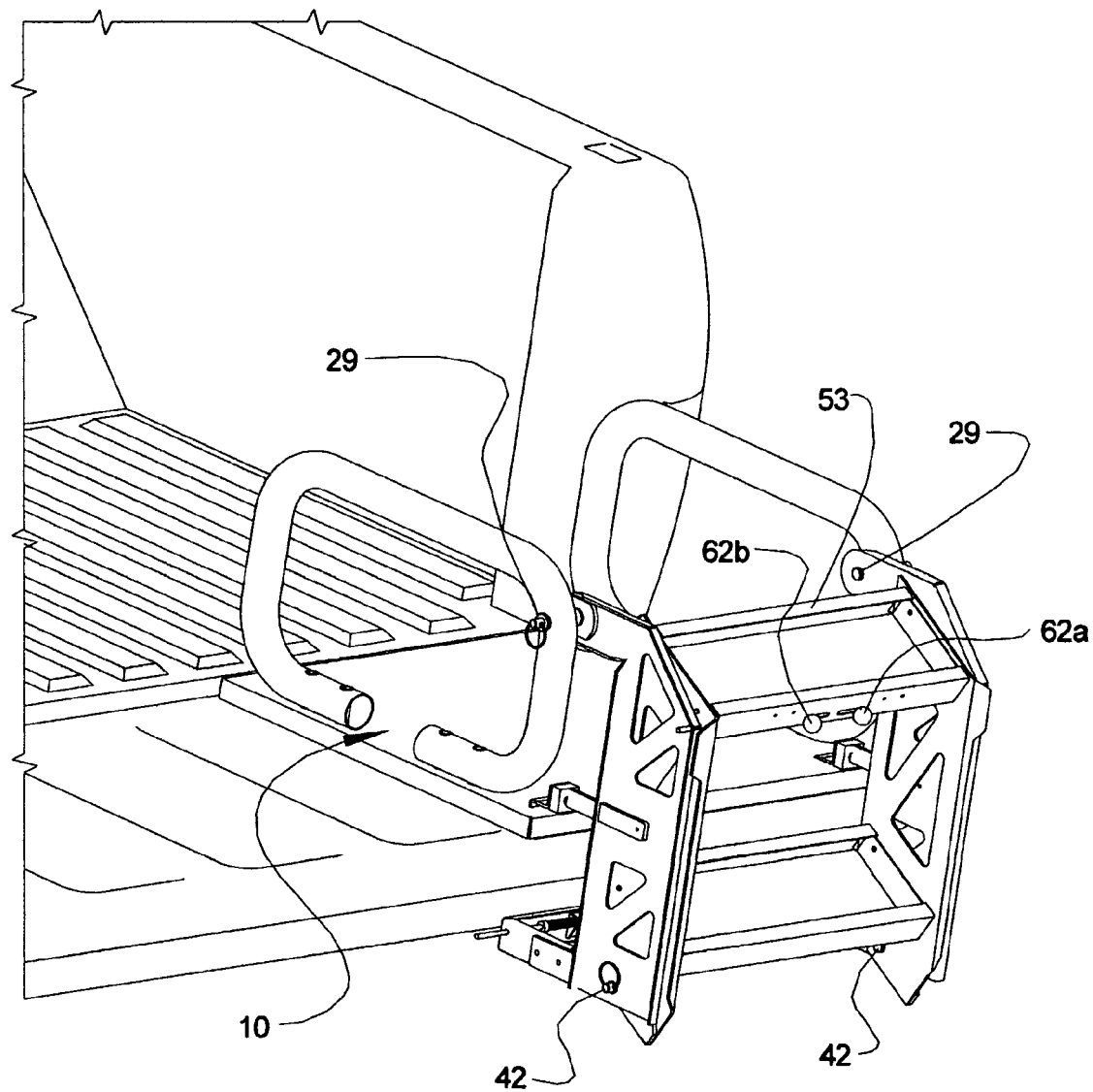
FIG. 3A shows the tailgate step assembly in the partially deployed position.
Figure 3B:
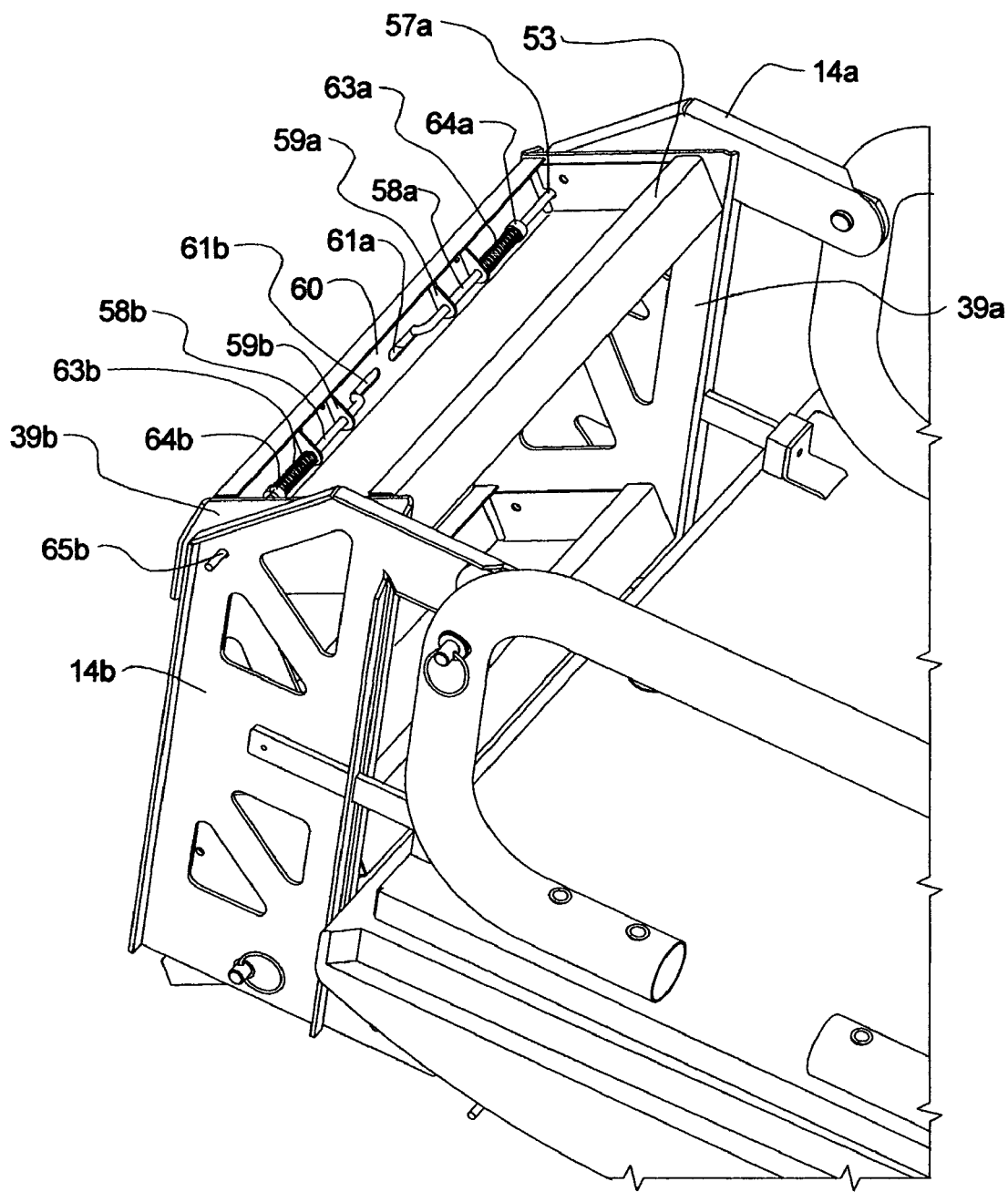
FIG. 3B shows an enlarged portion of the lower step.

Referring to FIG. 3B which shows an enlarged perspective view of the inside of the lower step 53, the lower step 53 has a lock mechanism similar to the lock rod system described previously, which secures the lower step legs 39a and 39b in a stowed position. The lower step 53 has a hole 57a and 57b punched or drilled on each end. A concentric hole is located on the lower step legs 39a and 39b. A lock rod 58a and 58b pass through the holes 57a and 57b. A lock rod bracket 59a and 59b is attached to the inside surface of a flange 60 on the lower step 53 with fasteners such as rivets. The lock rod bracket 59a and 59b attach the lock rod 58a and 58b to the lower step 53 and allow the lock rod 58a and 58b to slide back and forth through holes in the lock rod bracket 59a and 59b. The lock rod 58a and 58b has a 90 degree bend on the inboard end, which passes through a slot 61a and 61b in the flange 60. The inboard end of the lock rod 58a and 58b is threaded. A plastic knob 62a and 62b (refer to FIG. 3A) is threaded onto the inboard end of the lock rod 58a and 58b. The lock rod 58a and 58b pass through a compression spring 63a and 63b and a lock collar 64a and 64b. The lock collar 64a and 64b is locked onto the lock rods 58a and 58b with a setscrew. The compression spring 63a and 63b is trapped between the lock rod bracket 59a and 59b and the set collar 64a and 64b. A hole 65a and 65b in the upper step legs 14a and 14b provide an engagement point for the outboard end of the lock rod 58a and 58b.

OPERATION OF INVENTION

Figure 2:
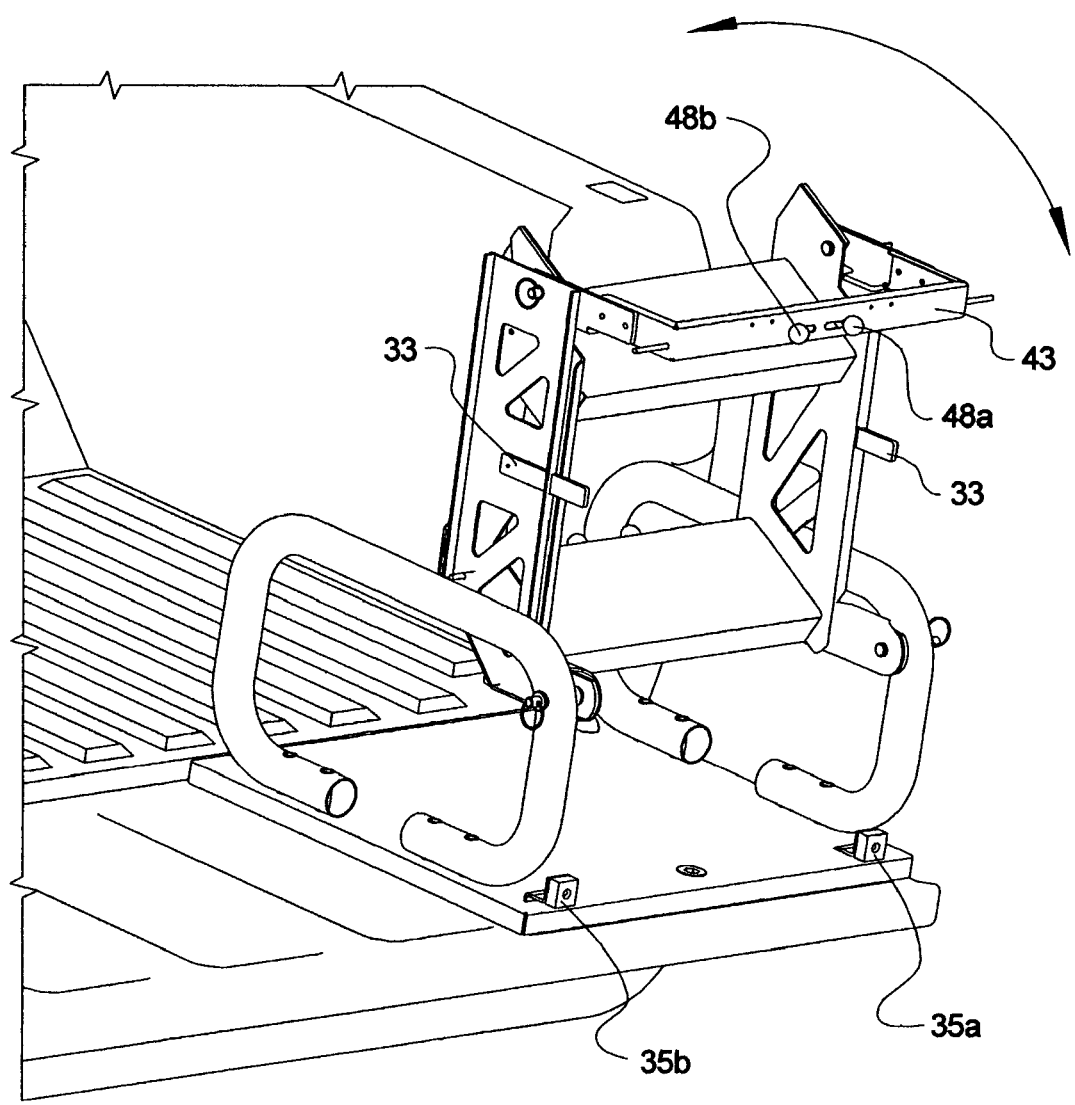
FIG. 2 shows the rotation of the tailgate step between the stowed position and the partially deployed position.

Referring to FIGS. 1A and 1C, the tailgate step assembly 10 is deployed by squeezing the plastic knobs 48a and 48b on the cross brace 43 together. This compress the compression springs 49a and 49b and moves the lock rods 45a and 45b inward, causing the outboard ends of the lock rods 45a and 45b to disengage from the holes 51a and 51b in the tubular grab handles 12a and 12b. While the plastic knobs 48a and 48b are still squeezed together, the cross brace 43 is lifted upward and toward the rear of the truck (refer to FIG. 2). The plastic knobs 48a and 48b can be released and the partially unfolded step assembly is rotated about the axis created by the tubular bearing block 26 270 degrees until the reaction brackets 33 on the upper step legs 14a and 14b contact the bumpers 35a and 35b on the base 13.

The tailgate step assembly 10 is now in the partially deployed position represented by FIG. 3A. To complete the deployment of the tailgate step assembly 10, the plastic knobs 62a and 62b on the lower step 53 are squeezed together causing the compression springs 63a and 63b to compress (refer to FIG. 3B) and move the lock rods 58a and 58b inward. This causes the outboard ends of the lock rods 58a and 58b to move inward and disengage from the holes 65a and 65b in the upper step legs 14a and 14b. While the plastic knobs 48a and 48b are still squeezed together, the lower step 53 is pulled toward the rear of the truck and downward. The plastic knobs 62a and 62b are released and the lower step 53 is rotated about the axis created by the clevis pin 42 150 degrees until the top edge of the spacer 41 on the lower step legs 53a and 53b contacts the flange 38 on the reaction, brackets 37a and 37b. The tailgate step assembly 10, represented in FIG. 4A, is now fully deployed and ready for use.

To return the tailgate step assembly 10 to the stowed position, referring to FIG. 4A, the lower step 53 is lifted upward while the plastic knobs 62a and 62b are squeezed together. This causes the lock rods 58a and 58b to move inward such that clearance exists between the outboard ends of the lock rods 58a and 58b and the inside surfaces of the upper step legs 14a and 14b. The lower step legs 39a and 39b rotate about the axis created by the clevis pin 42 150 degrees until the tab 56 on the lower step legs 39a and 39b contacts the upper step legs 14a and 14b. This contact causes the rotation of the lower step legs 39a and 39b to stop. The plastic knobs 62a and 62b are released, allowing the compression springs 63a and 63b to expand, pressing against the set collars 64a and 64b and the lock rod brackets 59a and 59b. This causes the lock rods 58a and 58b to move outward and engage the holes 65a and 65b in the upper step legs 14a and 14b. The tailgate step assembly 10, represented by FIG. 3A, is now locked in the partially deployed position. To complete stowing the tailgate step assembly 10 (referring to FIG. 3A), the upper step 52 is grasped and pulled rearward and moved upward causing the locked together upper and lower step legs 14a, 14b, 39a, and 39b to rotate about the axis created by the clevis pins 29. As the locked together upper and lower step legs 14a, 14b, 39a, and 39b are rotated to a position approximately 180 degrees from the deployed position (referring now to FIG. 2), the cross brace 43 is grasped and the plastic knobs 48a and 48b are squeezed together, compressing the compression springs, 49a and 49b and moving the lock rods 45a and 45b inward such that there is clearance between the outboard ends of the lock rods 45a and 45b and the inside surfaces of the tubular grab handles 12a and 12b. The locked together upper and lower step legs 14a, 14b, 39a, and 39b continue to rotate until at 270 degrees from the deployed position, the flanges of the upper step legs 14a and 14b contact the bumpers 66 stopping the rotation. The plastic knobs 48a and 48b are released allowing the compression springs 49a and 49b to expand, pressing against the set collars 50a and 50b and the lock rod brackets 46a and 46b. This causes the lock rods 45a and 45b to move outward and engage the holes 51a and 51b in the tubular grab handles 12a and 12b. The tailgate step assembly 10 is now locked in the stowed position represented in FIG. 1A.

The tailgate step assembly 10 can be quickly removed from the tailgate 18 when the space taken up by the tailgate step assembly 10 is needed. To accomplish removal (referring to FIG. 1A and 1B), the key 67 is inserted into the lock 22 and turned 90 degrees. This causes the lock pawl 23 to rotate, disengaging the lock pawl 23 from the underside of the return flange 24 on the lock bracket 20. Referring to FIG. 5A, the tailgate step assembly 10 is removed by lifting up the rear edge of the base 13 and sliding the tailgate step assembly 10 forward to disengage the return flange 17 from underneath the Z shaped mounting bracket 19. With the tailgate step assembly 10 removed from the tailgate 18, all that remains attached to the tailgate are the Z shaped mounting bracket 19 and the lock bracket 20 (refer to FIG. 5B).

CONCLUSION, RAMIFICATIONS, AND SCOPE

Accordingly, the reader will see that the tailgate step assembly of this invention provides safe and convenient access into the bed of a truck by providing two steps that project downward and rearwardly and by providing grab handles. In addition, this tailgate step assembly is completely supported by the tailgate and does not touch the ground making its use independent of ground condition. Furthermore, this tailgate step assembly has the additional advantages that it attaches to the inside panel of the tailgate and is completely concealed below the top edge of the tailgate so that this tailgate step assembly is compatible with other truck accessories such as bed covers and the outside physical appearance of the truck is not altered;

it is easily removed from the tailgate so that when the space taken up by the tailgate step assembly is needed, the user can quickly remove the tailgate step assembly;

it is locked onto the tailgate with a lock and key to prevent theft;

it has an attachment system that makes this tailgate step assembly fit many different tailgate designs, reducing the amount of inventory required to market and sell this tailgate step assembly to owners of different truck models.

Although the description above contains many specificities, these should not be construed as limiting the scope of the invention but as merely providing illustrations of some of the presently preferred embodiments of this invention.

Thus the scope of this invention should be determined by the appended claims and their legal equivalents, rather than by the examples given.

I claim:

1. A step assembly for attachment to a tailgate comprising:
a base for attachment to the inner surface of a tailgate;
a pair of rigid tubular members formed into a rectangular shape oriented parallel to and horizontally spaced apart from one another rigidly attached to said base;
said pair of rigid tubular members having sufficient height above said base to serve as grab handles by a human when utilizing said step assembly for access into and out of a bed of a truck;
said base and said tubular members having sufficient strength to completely support the weight of said step assembly with the full weight of a human on said step assembly;
a pair of rigid upper step legs pivotally connected to the rear upper corners of said tubular members for rotation from a stowed position through approximately 270 degrees to a deployed position;
said pair of rigid upper step legs contact said base when rotated approximately 270 degrees constraining further rotation of said upper step assembly;
a cross brace attached to the lower portion of said upper step legs rigidly tying said upper step legs together;
a reaction bracket attached to the lower portion of each upper step leg;
a pair of rigid elongated lower step legs pivotally connected to the lower portion of said upper step legs for rotation from a stowed position through approximately 150 degrees to a deployed position;
said pair of rigid elongated lower step legs when rotated approximately 150 degrees from stowed position contact said reaction brackets on lower portion of said upper step legs constraining further rotation of said lower step legs;
a plurality of steps attached therebetween said lower step legs;
whereby, when said tailgate is in an open or down position, and said upper step legs and said lower step legs are in said deployed position, said plurality of steps project downwardly and rearwardly from the plane of said open tailgate and said step assembly is fully supported by said tailgate and not in contact with the ground and said tubular members serve as grab handles providing safe access into said bed of said truck.

2. The step assembly of claim 1 further including a system to facilitate easy removal from and attachment to said tailgate comprising:

an elongated Z shaped mounting bracket configured for attachment to the inner surface of said tailgate proximate to the lower edge;

a lock bracket with a means to engage a lock pawl configured for attachment to the inner surface of said tailgate proximate to the upper edge;

said base having a return flange to engage underneath said Z shaped mounting bracket;

said base having a lock and lock pawi to engage said lock bracket and disengage said lock bracket when turned approximately 90 degrees;

whereby, said step assembly is lockable onto said tailgate in a rigid and secure fashion and quickly removable when desired by means of turning said lock and lock pawl approximately 90 degrees and lifting said base up and sliding forward.

* * * * *